United States Patent

[11] 3,580,145

| [72] | Inventor | Roy E. Vermes |
| | | Wilbraham, Mass. |
| [21] | Appl. No. | 791,595 |
| [22] | Filed | Jan. 16, 1969 |
| [45] | Patented | May 25, 1971 |
| [73] | Assignee | Revco Inc. |
| | | Agawam, Mass. |

[54] COUNTING APPARATUS
1 Claim, 6 Drawing Figs.

[52] U.S. Cl. .................................................. 93/93, 93/36
[51] Int. Cl. ..................................................... B31b 1/96, B31b 1/98, B65b 57/20
[50] Field of Search ....................................... 93/36 (SQ), 93

[56] References Cited
UNITED STATES PATENTS

| 3,442,186 | 5/1969 | Hirose | 93/93(M) |
| 3,526,170 | 9/1970 | Oderman | 93/93(C) |
| 3,528,565 | 9/1970 | Binzoni | 93/93(DP) |
| 2,403,062 | 7/1946 | Edwards | 93/93(.2) |
| 2,832,272 | 4/1958 | Gash | 93/93(.2) |
| 2,931,520 | 4/1960 | Shields | 93/36(SQ) |
| 2,988,236 | 6/1961 | Shields | 93/36(SQ) |
| 3,030,867 | 4/1962 | Wright | 93/36(SQ) |
| 3,182,537 | 5/1965 | Grody | 93/93(C) |
| 3,186,564 | 6/1965 | Hyer | 93/93X |
| 3,205,794 | 9/1965 | Califano | 93/93(M) |
| 3,291,010 | 12/1966 | Williamson | 93/93(C) |
| 3,391,616 | 7/1968 | Junco | 93/36(SQ) |

*Primary Examiner*—Wayne A. Morse, Jr.
*Attorneys*—Kenwood Ross and Chester E. Flavin ABSTRACT: A machine for accumulating carton blanks into in-seriatim-formed stacks of blanks of predetermined count and delivering the counted stacks as uniformly aligned units of blanks to a delivery station at one end of the machine, the machine comprising: a hopper for supporting a supply of the blanks to be counted, kicker means cooperant with the hopper for the in-seriatim ejecting of bundles of counted blanks from the hopper, an accumulator-aligner for accumulating and aligning a predetermined number of such bundles to form a stack, intermittently openable gate means cooperant with the accumulator-aligner and operably into gate opening position as a predetermined number of bundles in the stack has been attained, first conveyor means for conveying the stack delivered from the hopper by the kicker means to the accumulator-aligner, and second conveyor means for removing the stacks from the accumulator-aligner as the gate means is opened for delivery of the stack to a delivery station at one end of the apparatus.

INVENTOR.
ROY E. VERMES
BY Kenwood Ross and
Chester E. Flavin
ATTORNEYS.

INVENTOR.
ROY E. VERMES

PATENTED MAY25 1971 3,580,145

INVENTOR.
ROY E. VERMES
BY Kenwood Ross and
Chester E. Flavin
ATTORNEYS.

COUNTING APPARATUS

BACKGROUND OF THE INVENTION

1. Field of the Invention

Apparatus for automatically successively forming stacks of aligned corrugated box or carton blanks, each containing a predetermined number of the blanks.

Blanks are processed by a box or carton manufacturer on a box making machine and then must be manually removed, counted and formed into bundles or stacks of uniformly aligned blanks which are tied with suitable cord by an operator preparatory to shipment to the packager for use.

Such blanks are made at high rates of speed so that manual removal, counting and bundle forming are time-consuming operations which of necessity have to keep up with blank production whereby excessive numbers of personnel are required, all adding to the cost of the completed article. And errors in count are liable to occur where the counting is manually performed, further aggravating the problems.

The invention comprehends an apparatus which may be positioned in tandem at the end of a continuously operating production line for receiving the blanks as they are discharged, counting same and stacking them into a predetermined number in each in-seriatim-formed stack, and ejecting the counted stacks as uniformly aligned units of blanks, ready for tying.

2. Description of the Prior Art

It has been the custom in the trade to count manually and to form carton blanks into uniform stacks for tying or other operations, a time-consuming, inaccurate and costly procedure.

SUMMARY OF THE INVENTION

The invention provides apparatus that is simple in operation, will operate at a relatively high rate of speed, and may readily be positioned at the end of a continuously operating production line so as to receive box or carton blanks as they are discharged, say from a carton forming machine, at a relatively high rate of speed, count same, form uniform and even stacks of such blanks with each stack containing a predetermined number, and eject such stacks, all without any manual operation.

Stated otherwise, the invention relates to a machine for handling blanks, particularly those having a substantial degree of stiffness, as for example collapsed boxes of corrugated board or flat sheets. More specifically, it has to do with a machine for counting such blanks, stacking them and, when a predetermined number has been stacked, ejecting the stack and delivering it to a conveyor which transports it to another station where operations may be performed upon it, as for example tying or wrapping.

In general, the object of the invention is to devise a machine which will perform the stated operations in rapid and efficient manner. A more specific object is to provide means insuring that the stack of blanks formed will have its vertical edges in substantial alignment; a still further object is to provide automatic means for ejecting the stack when a predetermined number of blanks has been received and counted.

DESCRIPTION OF THE PREFERRED EMBODIMENT

In the trade, box or carton blanks are normally processed as units in multiples of five. Accordingly, the counting apparatus hereof may be preset to deliver five bundles of five blanks from a feed section to an accumulator at an ejection section where the bundles and blanks are "squared" and their edges aligned, the stack then being delivered by a conveyor system to other processing apparatus, not forming a part of the invention, for such as tying, preliminary to subsequent usage. Of course, it will be understood that the apparatus could be preset to handle blanks in multiples other than five.

The apparatus comprehends two basic subassemblies or section, namely, a counting section, generally indicated by 10, and an ejection section, generally indicated by 12, the operation of each of which is regulated by a control means 14.

The blanks will be continuously delivered to such apparatus, as for example from a blank forming machine, by suitable mechanism which per se is not a part of the present invention.

THE COUNTING SECTION

Figure 2:
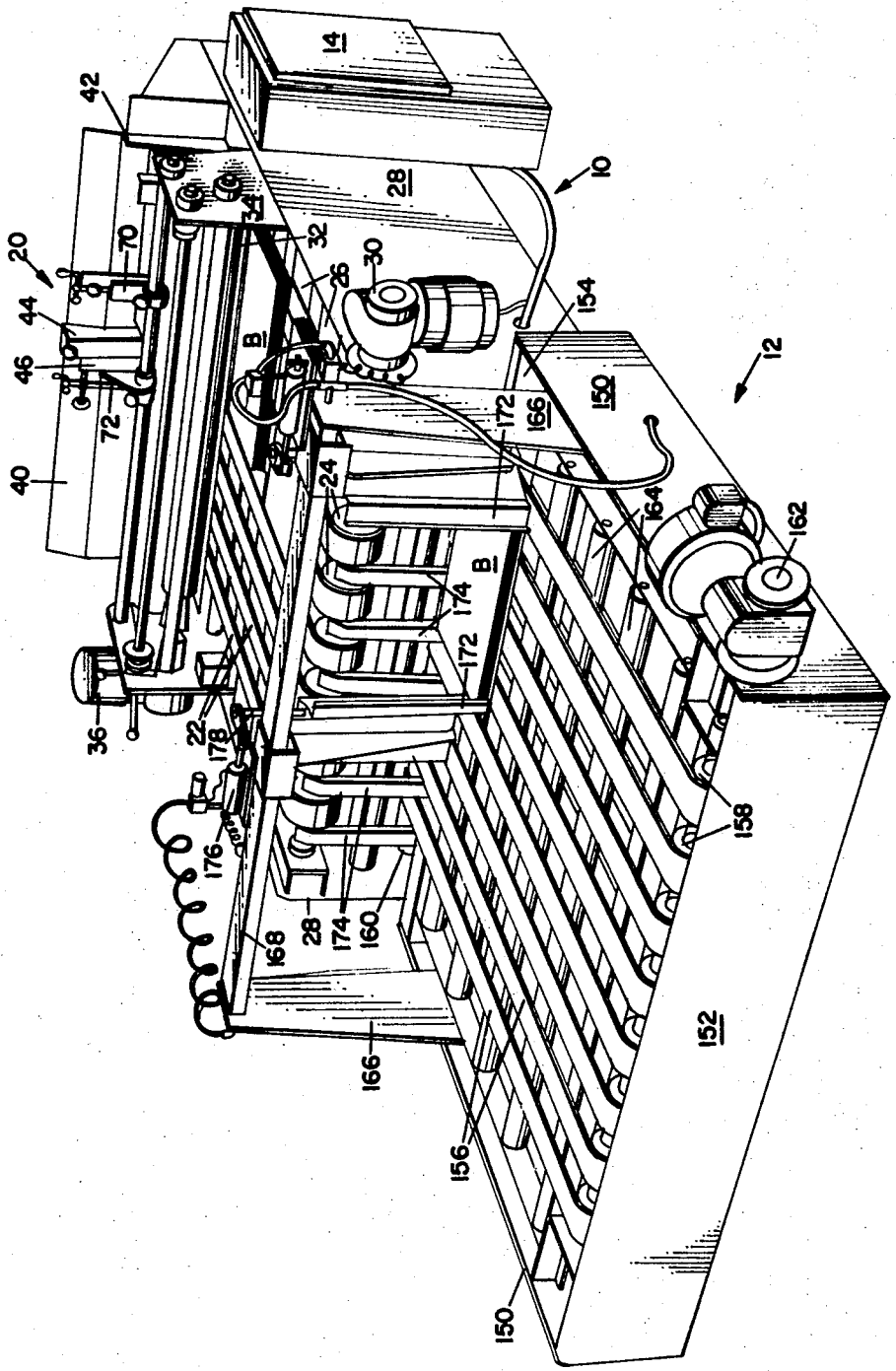
FIG. 2 is a view, in perspective, of the apparatus of FIG. 1 as seen from the opposite side thereof.

In the embodiment shown, counting section 10 includes a feed hopper 20 for receiving a supply of carton blanks B and an endless belt conveyor means, located generally forwardly of the feed hopper and comprising a plurality of spaced parallel endless belts 22 entrained about spaced rollers 24 and passing over a multiplicity of idler support rolls 26 extending transversely between and journaled in a pair of spaced opposite and parallel upright side frames or beams 28, rollers 24 being driven by a drive motor 30 strategically mounted on one of the side frames, as shown in FIG. 2.

The belts define a conveyor which is so mounted that the upper reaches of the belts which comprise the conveying surface are slightly above the upper horizontal plane of the side frames or beams.

A drive roll 32 is journaled in a pair of spaced opposite end plates 34, each extending upwardly from a side frame 28, the drive roll extending transversely relative to the direction of belt travel and forwardly of feed hopper 20 and immediately above belts 22 for bearing upon the upper surface of the uppermost blank of a bundle thereof as same is fed from the feed hopper. The drive roll is driven by a drive motor 36 mounted on an end plate 34, which drive may be directly from the drive motor or indirectly via a suitable sprocket and chain arrangement with appropriate hand controls so that drive roll rotation may be easily initiated and/or terminated.

Figure 3:
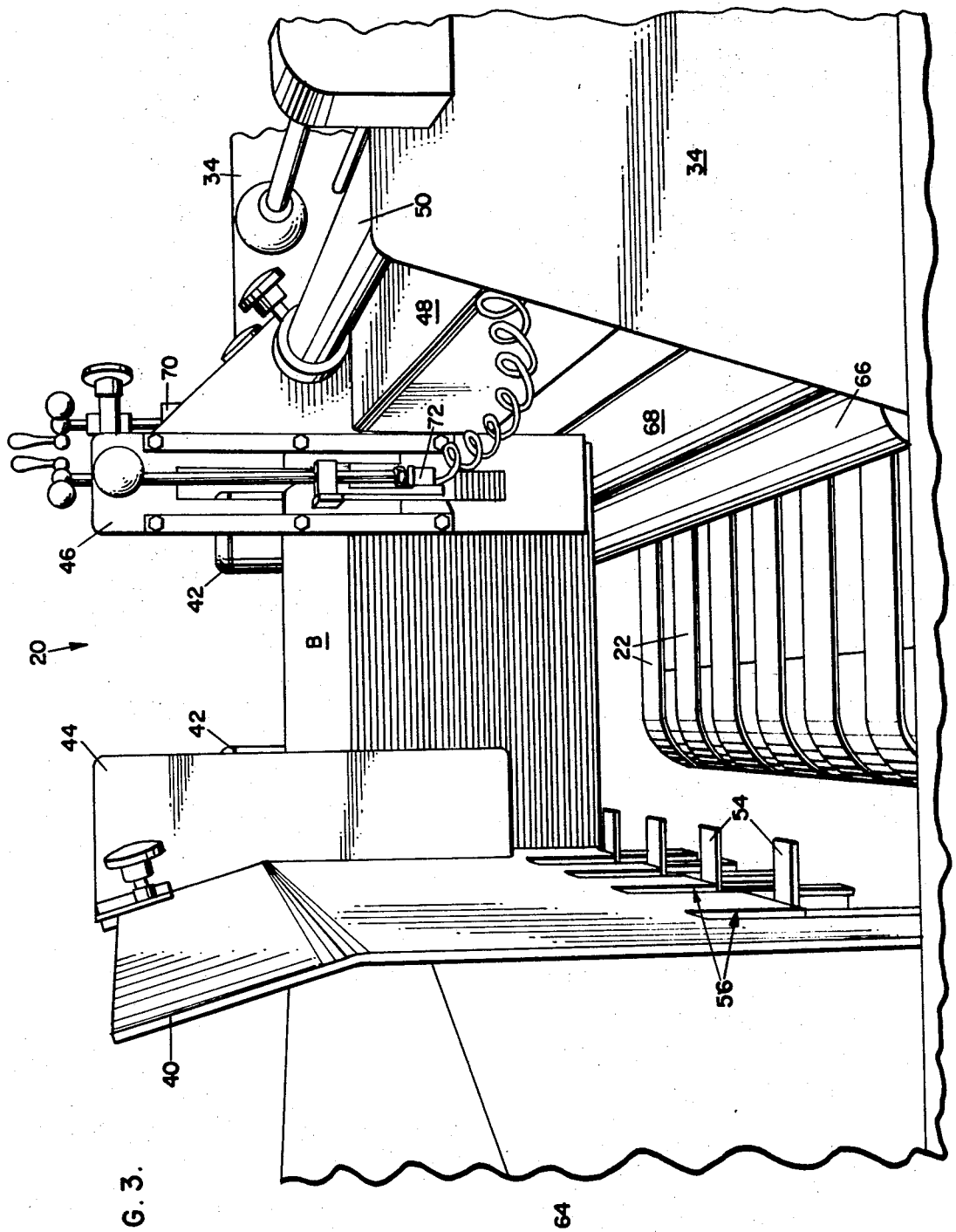
FIG. 3 is a fragmentary view, in perspective, of the feed hopper and associated components of the apparatus.

With reference to FIG. 3, feed hopper 20 is seen to include a rearward vertical wall 40, spaced vertical sidewalls 42 at one side thereof, and spaced vertical sidewalls 44 and 46 at the opposite side thereof, and a forward vertical wall 48 which is fixed to and extends between end plates 34.

Sidewall 44 will be laterally adjustable relative to rear wall 40, and sidewall 46 will be laterally adjustable relative to and along a guide rod 50 extending between end plates 34. Forward wall 48 will be longitudinally adjustable, such movement being effected by the horizontal movement of the end plates relative to their respective side frames 28, all wherefor the dimensions of the feed hopper can be changed to accommodate various blank sizes.

Figure 1:
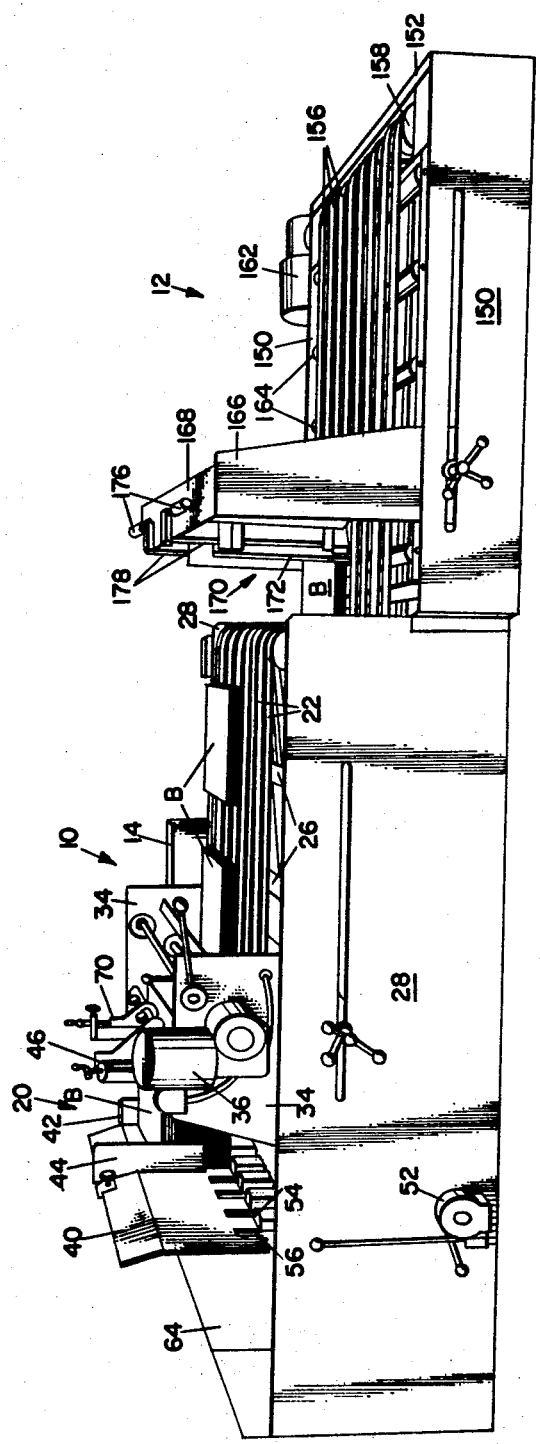
FIG. 1 is a view, in perspective, of counting apparatus embodying the invention.

A worm gear box 52, seen in FIG. 1, mounted on one of the side frames, is suitably linked to end plates 34 for effecting longitudinal adjustment of the end plates with respect to the side frames.

Figure 4:
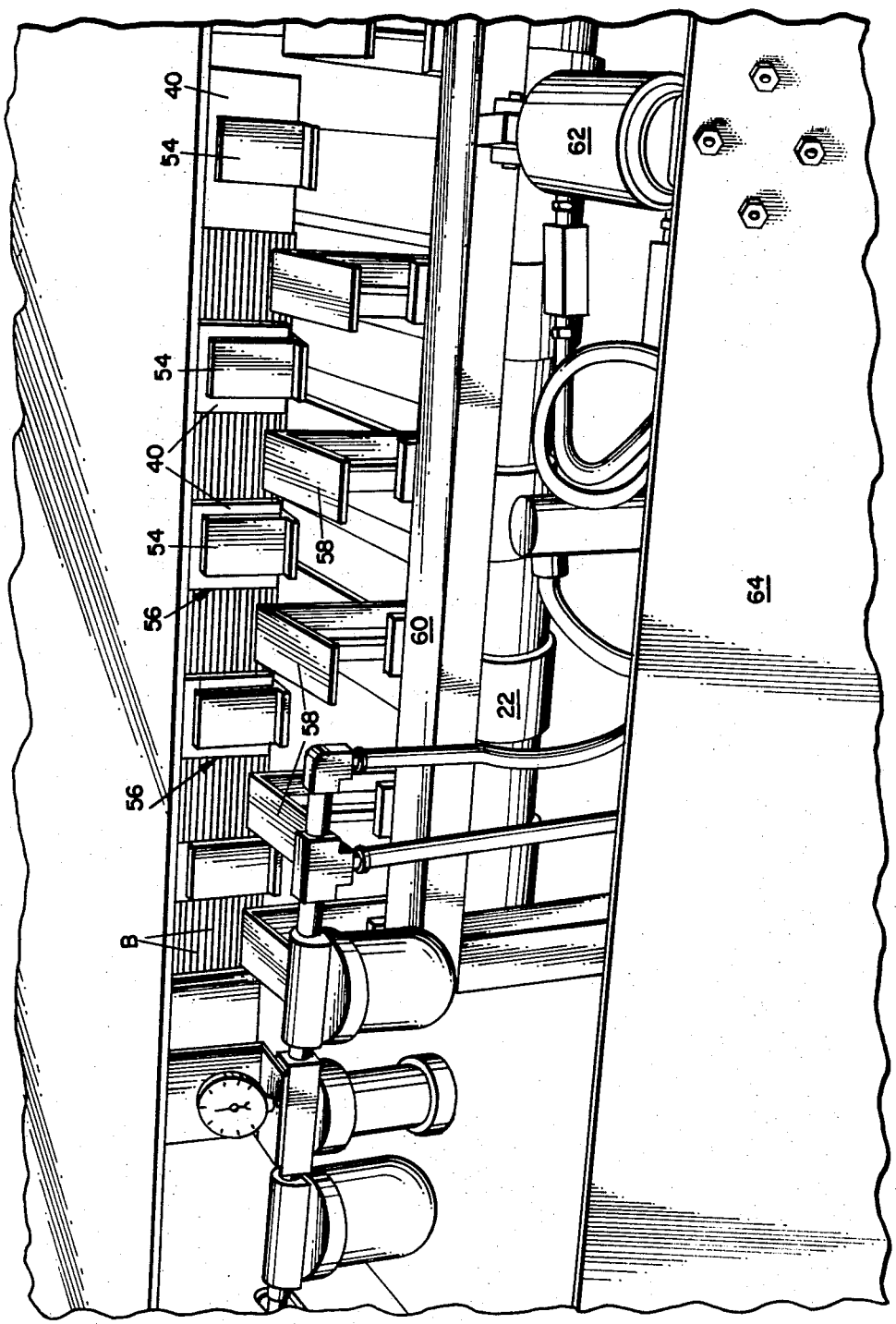
FIG. 4 is a fragmentary view, in perspective, of the feed hopper and feed means of the apparatus, as seen from the rear of the feed hopper.

With reference to FIGS. 3 and 4, a plurality of spaced, generally L-shaped, support brackets 54 are fixed to feed hopper rear wall 40 and have forwardly facing foot portions which extend forwardly therefrom into the feed hopper to provide a base support for the rear edges of the blanks delivered to the feed hopper.

Feed hopper rear wall 40 is provided with a plurality of kicker-receiving slots 56 extending vertically upwardly from the lower planar edge of the wall, the slots being spaced as to each other, there being one between each adjacent pair of brackets 54. Thereby, the rear edges of the lowermost of the blanks are exposed through the feed hopper rear wall, as can be observed in FIG. 4. Rearwardly of the feed hopper rear wall 40, a plurality of upstanding kicker plates 58 are mounted at spaced intervals upon the forwardly facing face of a kicker bar 60 which is disposed from side to side of the apparatus. The kicker plates are so spaced that each will enter one of the slots 56 when the kicker bar is motivated forwardly, through the action of a piston in a cylinder 62 fixed to a rear wall 64 of the apparatus, the piston being suitably connected to the kicker bar centrally of its longitudinal length.

Kicker bar 60 is vertically adjustable to any desired position so that kicker plates 58 can be caused to contact only a certain number of the blanks as the kicker plates pass forwardly through slots 56 in hopper rear wall 40.

The usual desired number of blanks to be counted and delivered from the feed hopper, at one time is five, wherefore the kicker bar is so adjusted vertically that the kicker plates will contact the rear edges of only the lowermost five blanks in the feed hopper.

On forward stroke of the piston of cylinder 62, the kicker plates will contact the lowermost five blanks so as to separate same from the blanks thereabove, if any, and to push them forwardly as a bundle over a transversely extending support roll 66 and a front support ledge 68 and under feed hopper forward wall 48.

To insure that only five blanks are so discharged from the feed hopper, a vertically and horizontally adjustable limit bar 70 is mounted on guide rod 50 immediately forwardly of the feed hopper.

Horizontally, the limit bar is positioned approximately centrally of the feed hopper; vertically, it is positioned so that its lower edge permits the passage of five blanks therebelow and precludes the passage of more than five.

The limit bar will be adjusted horizontally from side to side of the apparatus so as to be located substantially centrally of the feed hopper according to its dimensions depending upon the size of blanks being served.

Likewise, the limit bar will be adjusted vertically so as to accommodate to the number of blanks being counted and the particular thickness thereof, being varied according to such count and to such thickness.

The bundle of blanks, after being driven under feed hopper forward wall 48 by the driving force of the kicker bar and kicker plates, are sufficiently forward as to be gripped between drive roll 32 thereabove and belts 22 therebelow so as to be fully withdrawn from the feed hopper. After clearing past the drive roll, the bundle of blanks is carried forwardly by the belts for delivery to the ejection section.

A low limit switch 72, best seen in FIG. 3, is mounted upon feed hopper sidewall 46 and functions, when the number of blanks in the feed hopper falls below a certain predetermined number, to render the kicker plates inoperative, it being vertically adjustable relative to the feed hopper wherefore its setting may be varied to suit the desires of the operator.

Figure 5:
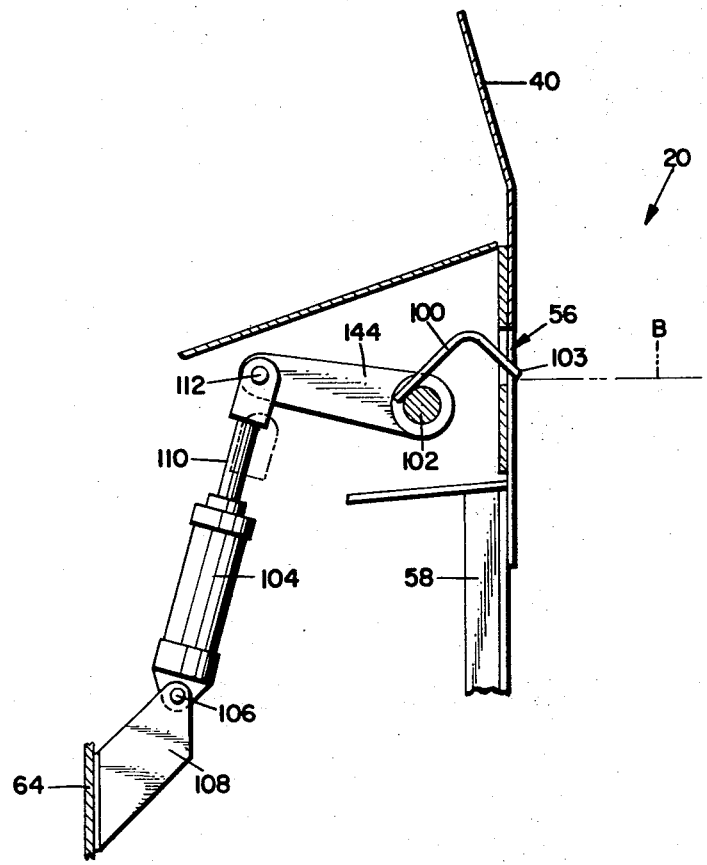
FIG. 5 is a fragmentary, part-sectional side-elevational view of the feed hopper rear compression means, useful as a modification of the invention.
Figure 6:
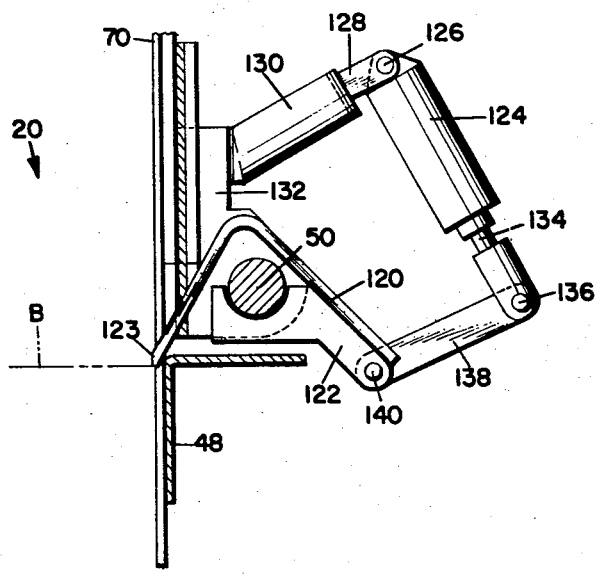
FIG. 6 is a fragmentary, part-sectional side-elevational view of the feed hopper forward compression means, useful as a modification of the invention.

To accommodate for imperfect blanks and/or to compress the forward and rear ends of the blanks so that they will be true with the settings of the kicker plates and the low limit switch, means in the form of modifications to the main apparatus may be provided on the feed hopper. As shown in FIG. 5, a plurality of rear compression fingers 100 may be installed, and as shown in FIG. 6, a plurality of forward compression fingers 120 may be installed. Each finger will have a free end bearing upon the uppermost blank in the feed hopper with the fingers being movable in a rapid, up and down tapping movement so as to move the free ends of the fingers into and out of contact with the blank so as to compress the stack thereof at the forward and rearward edges of the blanks.

In FIG. 5, an L-shaped rear compression finger 100 is fixed at one end to a transversely extending cross rod 102 disposed rearwardly of feed hopper rear wall 40 and journaled at its opposite ends to side frames 28. The plurality of such compression fingers are positioned in spaced relationship along the cross rod so as to be aligned with provided slots 56 in the feed hopper rear wall. A free end 103 of each of the fingers extends through its respective slot and into the feed hopper interior so as to rest upon the uppermost blank of the stack adjacent the rear edge of that blank. A cylinder 104 is pivoted at 106 to a bracket 108 fixed to apparatus rear wall 64. A ram 110 of the cylinder is pivoted at 112 to the rear end of a link 114 having its opposite end fixed to cross rod 102. The cylinder is intermittently actuated by suitable means so as to rotate cross rod 102 to raise and lower the outer free ends 103 of the plurality of fingers 100 and thus to move them rapidly into and out of contact with the uppermost blank, thereby to compress the stack adjacent its rear edge.

In FIG. 6, an L-shaped forward compression finger 120 is fixed at one end to a bracket 122 mounted for rotation relative to guide rod 50 between feed hopper sidewall 46 and limit bar 70. The plurality of such compression fingers are positioned relative to the guide rod so that a free end 123 of each finger extends into the feed hopper interior so as to rest upon the uppermost blank of the stack adjacent the forward edge of that blank. A cylinder 124 is pivoted at 126 to a link 128 extending outwardly from one end of a bracket 130 fixed at its opposite end to a portion of a frame 132 holding limit bar 70. A ram 134 of the cylinder is pivoted at 136 to one end of a link 138 pivoted at 140 at its opposite end to bracket 122. The cylinder is intermittently actuated by suitable means so as to rock bracket 122 and to raise and lower the outer free ends 123 of the plurality of fingers 120 and thus to move them rapidly into and out of contact with the uppermost blank thereby to compress the stack adjacent its forward edge.

THE EJECTION SECTION

Ejection section 12 is a flat bedlike structure unitary with and forwardly of counting section 10 and includes a pair of spaced side frames 150 interconnected by front and rear transverse frames 152 and 154 respectively.

A plurality of spaced, longitudinally extending endless belts 156 are entrained about a plurality of rollers 158 adjacent the forward end of the ejection section and a roll 160 adjacent the forward end of the feed section.

Rollers 158 are driven by a drive motor 162 strategically mounted on a side frame 150 and the belts travel over a plurality of idler support rolls 164 journaled in and extending transversely between the side frames.

A superstructure, extending upwardly from the side frames, includes a pair of spaced, upright end plates 166, each mounted for horizontal sliding adjustment relative to one of the side frames, the end plates being interconnected at their upper ends by a cross arm 168.

An accumulator, generally indicated by 170, is disposed between end plates 166 for allowing accumulation of the desired number of bundles of blanks into a stack, as the bundles are delivered in seriatim from feed section 10.

When the desired number of bundles has been stacked, the gates of the accumulator are opened and the stack is moved forwardly by the belts 156 over the rollers 164 and ejected from the forward end of the machine to whatever equipment is provided for delivering to the next operation station.

Accumulator 170 includes a pair of spaced, upright front gates 172 suspended from crossbeam 168 and a rear wall comprised of a plurality of spaced upright alignment bars 174 suspended from a shaft extension of drive motor 30 so as to each be disposed between a pair of adjacent rollers 24.

The lower ends of alignment bars 174 are free while the upper ends thereof are eccentrically mounted upon the shaft extension wherefore, as the shaft rotates, the alignment bars are caused to move forwardly and rearwardly relative thereto with the free lower ends continually contacting, in a kicking manner, the trailing edges of the blanks collected in the accumulator so as to align such blanks.

Gates 172 of the accumulator are each operated by a cylinder 176, operatively connected to a rod 178 fixed to the gates and actuation of these cylinders pivots rods 178 to cause the gates to swing opened or closed.

OPERATION

Generally speaking, when the counting section is operative, the ejection section is inoperative, and vice versa.

A counting means, now shown, is provided in the counting section and registers each bundle of five blanks as that bundle is pushed forwardly from feed hopper 20 by kicker plates 58, the counting means relaying such intelligence to control means 14.

When the desired number of bundles to form one stack has been registered by the counting means and those bundles have been stacked in the accumulator, the kicker plates are rendered inoperative and the ejection section feed belts 150 are simultaneously rendered operative and the front gates of the accumulator are simultaneously opened so that the stack may be moved forwardly and outwardly therefrom.

When the stack has reached the forward end of the machine, the cycle is again repeated.

I claim:

1. Machine for accumulating carton blanks into in-seriatim-formed stacks of blanks of predetermined count and delivering the counted stacks as uniformly aligned units of blanks to a delivery station at one end of the machine comprising:
   1. a counting section including:
      a. an infeed hopper for receiving a supply of the blanks to be counted,
      b. a plurality of support brackets having forwardly facing foot portions extendable into the infeed hopper and providing a first lower support for the blanks within the hopper,
      c. an endless first belt conveyor means disposed below and forwardly of the infeed hopper and providing a second lower support for the blanks within the hopper,
      d. drive means for driving the first belt conveyor means,
      e. counting means for measuring the height of a predetermined number of blanks collected in the infeed hopper, and
      f. adjustable piston actuated kicker means swingable into the infeed hopper for the in-seriatim ejecting of the bundle of the predetermined number of blanks from the infeed hopper,
   2. an ejecting section including:
      a. a bundle accumulator-aligner hopper for accumulating and aligning a predetermined number of bundles delivered thereto from the infeed hopper by the first belt conveyor means to form a stack of the bundles,
      b. intermittently-openable gate means cooperant with the accumulator-aligner hopper and operable into gate opening position as a predetermined number of bundles in the stack has been attained,
      c. second belt conveyor means for removing the stacks from the accumulator-aligner as the gate means is opened for delivery of the stack to a delivery station at one end of the apparatus.